United States Patent Office 3,634,344
Patented Jan. 11, 1972

3,634,344
PROCESS OF PRODUCING POLYESTER FOAMS
Gotz Koerner and Gerd Rossmy, Essen, Germany, assignors to Th. Goldschmidt A.-G., Essen, Germany
No Drawing. Filed June 26, 1969, Ser. No. 836,987
Claims priority, application France, July 4, 1968, 157,859
Int. Cl. C08g 22/44, 51/00
U.S. Cl. 260—2.5 AH                4 Claims

ABSTRACT OF THE DISCLOSURE

In a process of producing polyester foams based on polyesterurethanes or hardenable unsaturated polyesters, foam stabilizers are used which are polyoxyalkylene-polysiloxane mixed block polymers whose polyoxyalkylene blocks have an average molecular weight of between about 1400 to 3000 and which contain up to 65 to 100% by weight of ethylene oxide. The polysiloxane blocks contain on the average 3 to 15 silicon atoms of which 2 to 12 are present in the form of dimethylsiloxy groups while the remaining silicon atoms form trifunctional siloxy units and/or are connected with the polyoxyalkylene block.

FIELD OF INVENTION

The invention relates to a process for the production of polyester foams on the basis of polyesterurethanes or hardenable unsaturated polyesters, which are formed in the presence of surface active foam stabilizers.

PRIOR ART

It has previously been suggested to react hydroxyl group containing polyesters with organic diisocyanates in the presence of catalysts, and a blowing agent such as water and/or propellants. In doing so, foams on the basis of polyesterurethanes are formed. In order to be able to carry out the foaming in a successful manner, it is necessary to admix the reaction charge with special foam stabilizers. The foam stabilizers are required in order inter alia to prevent collapse of the primarily formed foam and to obtain a desired fine and uniform pore structure. The chemistry and technology involved in the preparation of polyesterurethane foams is discussed in the book "Polyurethanes Chemistry and Technology" by Saunders and Frisch, published by Interscience Publishers.

It has also been proposed to foam hardenable unsaturated polyesters. For this purpose, polyesters are customarily used which are obtained by reaction of divalent alcohols with unsaturated dicarboxylic acids, as for example, maleic acid or fumeric acid. Other saturated or aromatic dicarboxylic acid may be coesterified at the same time. Such other acids are, for example, sebacic acid, phthalic acid and terephthalic acid. These polyesters are then foamed in the presence of propellants which upon decomposition liberate nitrogen, $CO_2$ or other gases, and are hardened by peroxide catalysts. Such polyesters are available on the market, for example, under the trade name "Leguval." However, also in the above-mentioned procedure, special foam stabilizers have to be added to the foaming charge with a view to obtaining a uniform foam of desirable pore structure.

German Auslegeschrift 1,215,922 discloses a procedure for the production of polyurethane foams by a one-step reaction of polyesters, polyisocyanates and water with the addition of foam stabilizers which are organopolysiloxanes modified by polyesters. It has also repeatedly been recommended in the past to use for the indicated purpose, polyoxyalkylene - polysiloxane - mixed block polymers as they are known from the foaming of polyetherurethanes. However, the known block copolymer foam stabilizers do not satisfactorily meet all the requirements for foaming procedures of the indicated kind. This is particularly so because already small excess amounts of such stabilizers cause the formation of foams which have a pore structure of undesired coarse cells. Further, these known polyoxyalkylene - polysiloxanes - mixed block polymers exert no foam stabilizing activity whatsoever in the production of polyesterurethane foams of low volume weight. For this reason, it is necessary to combine the indicated stabilizers with additional organic surface active substances, such as emulsifiers.

SUMMARY OF THE INVENTION

The primary purpose of the present invention is to provide foam stabilizers which, without requiring the addition of further surface active substances such as emulsifiers, can be successfully used in foaming processes of the indicated kind in varying dosage amounts without affecting the final foam and which cause the formation of superior foams of small and uniform cell structure even at volume weights of <20 kg./m.$^3$.

Briefly, and in accordance with the invention, it has surprisingly been ascertained that the above objects are superiorly obtained by using foam stabilizers which are polyoxyalkylene-polysiloxane-mixed block polymers whose polyoxyalkylene blocks have an average mole weight of 1400 to 3000, preferably 1600 to 2000 and which consist of 65 to 100% by weight of ethylene oxide, the remainder of the blocks being made up of propyleneoxide and, if desired, higher alkylene oxides. Further, the polysiloxane blocks of the mixed copolymers contain in the average 3 to 15 silicon atoms of which 2 through 12 atoms are present in the form of dimethylsiloxy groups while the remaining silicon atoms form trifunctional siloxy units and/or are connected with the polyoxyalkylene block.

Preferred polyoxyalkylene - polysiloxane mixed block polymers are those which have 2 to 5, preferably 2 to 3, polyoxyalkylene blocks in the average molecule. It is of particular advantage if the polysiloxane block has a very narrow molecular weight distribution or if the polysiloxane, which is used for the preparation of the mixed block polymer, has been equilibrated prior to reaction with the polyoxyalkylene derivatives.

The different alkylene oxide units within the polyoxyalkylene block are preferably mixed in approximately statistical manner. In doing so, the propylene oxide moiety within the polyoxyalkylene block may be increased if the number of dimethylsiloxy groups is reduced.

Examples of polyoxyalkylene-polysiloxane mixed block polymers which can successfully be used in the inventive process are depicted in Formulae I and II which, of course, should be viewed as average formulae. The polyoxyalkylene-polysiloxane mixed block polymer may thus be represented by the following Formula I:

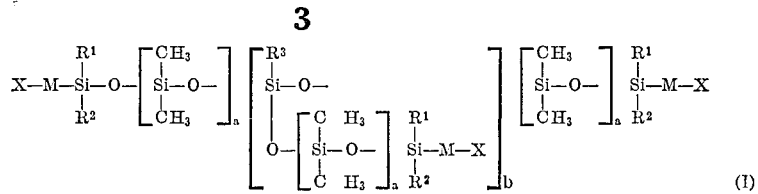

(I)

In this formula, X stands for a polyoxyalkylene block of the formula $$[-C_nH_{2n}O]_mZ$$

The symbols $m$ and $n$ indicate suitable numbers whose values are determined by the ethylene oxide content and the mole weight; $n$ may, for example, have the value of 2. The polyoxyalkylene block consists then exclusively of ethylene oxide units. The value of $n$ increases with increasing contents of propylene oxide and higher alkylene oxides.

Z indicates a terminal substituent, and is preferably alkyl, aryl or acyl.

If M is an oxygen atom, then a portion of the X groups may stand for alkyl or trialkylsilyl. However, the maximum amount of X groups having such meanings is 50%.

M represents the atom or group which connects in a manner known per se, the polysiloxane block and the polyoxyalkylene block. Examples of such linking members, as they are known in the art, are for example,

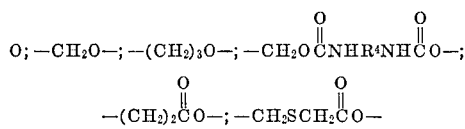

$R^4$ is a divalent hydrocarbon which, if desired, may be substituted. An example for such hydrocarbon is 2,4-toluylene. Generally, however, other hydrocarbon groups which connect silicon and X through an oxygen atom linked to X, are suitable for the inventive purposes.

The groups $R^1$ and $R^2$ stand for hydrocarbon, particularly lower alkyl, as for example, methyl. They may, however, also stand for MX.

$R^3$ may be the same as $R^1$ or may be

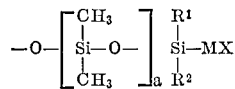

$a$ is a number having a value of 0 to 10, while $b$ is a number from 0 to 3. The values for $a$ and $b$ must, moreover, be chosen so that at the most 15 and at least 3 Si-atoms are contained in the polysiloxane block and that of these Si-atoms, at least 2 and at the most 12 are present in the form of dimethylsiloxy units.

Another structure suitable for the inventive purposes is depicted by the following Formula II:

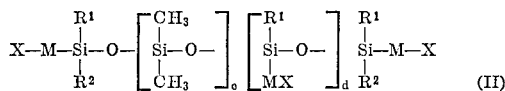

(II)

The substituents of this formula have the same meaning as in Formula I. Symbol $c$ is a number having a value of between 1 to 10, while $d$ is a number having a value of between 0 to 3 and $c+d=1$ to 13.

The preparation of the compounds to be used in accordance with this invention and, of course, also of the compounds indicated in the examples, is effected in accordance with well-known procedures.

The invention will now be described by several examples, it being understood, however, that these examples are given by way of illustration and not by way of limitation and that many changes may be effected without affecting in any way the scope and spirit of the invention as recited in the appended claims.

EXAMPLE I

The purpose of this example is to demonstrate the surprising technical advance of the inventive process. All the polyoxyalkylene-polysiloxane-mixed block polymers which are compared in this example were prepared in a manner analogous to the process disclosed in U.S. Pat. No. 3,115,512 from equilibrated chlorosiloxanylsulfates by reaction with polyoxyalkylenemonobutylethers.

The chlorosiloxanylsulfates can also properly be depicted by the Formula I, wherein the group MX in this instance stands for Cl and $$\frac{SO_4}{2}$$

The $SO_4$-content amounts to about 1.3 to 1.8 g./silicon atom in the average molecule. The groups $R^1$, $R^2$ and $R^3$ stand for methyl.

The polyoxyalkylenemonobutylethers were produced by addition of a mixture of ethyleneoxide and propyleneoxide in quasi statistical manner to butanol, until the desired mole weight had been obtained. In doing so, care was taken that the alkylene oxide which is added last is propylene oxide.

The reaction of these polyoxyalkylenemonobutylethers with the equilibrated chlorosiloxanylsulfates takes place in a toluene solution under neutralization with ammonia. The final products may also be represented by the Formula I, wherein M stands for oxygen and X corresponds to the formula $$[C_nH_{2n}O]_mC_4H_9$$

The values for $n$ and $m$ are dependent on the mole weights of the polyoxyalkylene blocks indicated in the following Table 1. The values of $a$ and $b$ are also indicated in Table 1.

Testing of the effectiveness of the polyoxyalkylene-polysiloxane mixed block polymers was done by a foaming test. For this purpose, 200 g. of a polyester, 8 g. of water and 0.5 g. of N-β-aminoethyl-2,2,3,3,5,5,6,6-octamethyl piperazine and an amount of polyoxyalkylene-polysiloxane mixed block polymer as indicated in the table, were well mixed with a disk-like stirrer. The polyester had been prepared from adipic acid and diethylene glycol under admixture of small amounts of triol. The polyester had an OH number of 58 and is known in the trade under the designation "Desmophen 2200." The mixture thus obtained was admixed with 101 g. of toluylene-diisocyanate (mixture of the 2,4- and 2,6-isomers in a ratio of 65:35) and the stirring was subsequently continued while increasing the agitation speed to 3000 r.p.m. The stirring at this high velocity was effected for 10 seconds. The mixture was foamed in metal molds of 28 cm. length, 14 cm. width and 14 cm. height. Table 1 indicates the final foam heights after hardening, the extent of retraction of the primarily formed foam immediately after reaching the maximum height, as well as the cell structure of the foam. A polyoxyalkylenepolysiloxane-mixed block polymer is regarded as satisfactory if a high, fine foam block is formed which does not significantly retract.

In the tests 1 through 4, a polyoxyalkylenepolysiloxane mixed block copolymer according to the invention was used, while in tests 5 through 11, similarly composed compounds, however, outside the indicated ranges were used for comparison purposes.

TABLE 1

| Test No. | a | b | Number of Si atoms in average molecule | Ethylene oxide content of polyoxyalkylene block (percent by weight) | Mole weight of the polyoxyalkylene blocks | Number of polyoxyalkylene blocks in average molecule | X g. polyoxyalkylene-polysiloxane mixed block polymer | Foam height in cm. | Retraction cm. | Cell structure and foam defects |
|---|---|---|---|---|---|---|---|---|---|---|
| A: Polyoxyalkylene polysiloxanes according to the invention ||||||||||| 
| 1 | 1 | 0 | 4 | 90 | 1,900 | 2 | 2.4 / 1.2 | 21.0 / 20.0 | — | Fine, satisfactory. Do. |
| 2 | 2 | 0 | 0 | 75 | 1,810 | 2 | 2.4 / 0.6 | 21.5 / 21.0 | — / 0.5 | Do. Do. |
| 3 | 4 | 0 | 10 | 75 | 1,810 | 2 | 2.4 / 0.6 | 21.5 / 21.5 | — | Do. Do. |
| 4 | 0.5 | 1 | 5.5 | 75 | 1,810 | 3 | 2.4 / 0.6 | 21.5 / 21.0 | 0.5 / 0.5 | Do. Do. |
| B: Other polyoxyalkylene-polysiloxanes ||||||||||| 
| 5 | 1 | 0 | 4 | 42 | 1,870 | 2 | 2.4 | | | Collapse |
| 6 | 1 | 0 | 4 | 85 | 800 | 2 | 2.4 | 19.5 | 1.5 | Fine, however, interior of foam block collapses. |
| 7 | 4 | 0 | 10 | 42 | 1,870 | 2 | 2.4 | | | Collapse |
| 8 | 6.1 | 0 | 14.2 | 70 | 1,750 | 2 | 2.4 | 17.0 | 2.5 | Coarse. |
| 9 | 0.5 | 1 | 5.5 | 60 | 1,740 | 3 | 2.4 | | | Foam boiled apart |
| 10 | 2 | 2 | 14 | 70 | 1,815 | 4 | 2.4 | 20.5 | 0.5 | Enlarged in sponge-like manner. |
| 11 | 5.4 | 2 | 27.6 | 75 | 1,810 | 4 | 2.4 | 22.5 | 0.5 | Enlarged. |

EXAMPLE II

In this example, a polyoxyalkylenepolysiloxane-mixed block copolymer was produced and tested for suitability. The structure of the polymer had the average formula

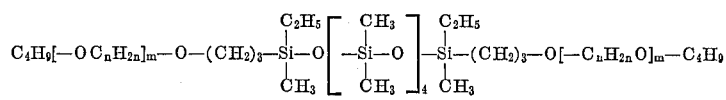

First 1,3-diethyl-1,3-dimethyldisiloxane of the formula

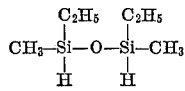

was produced by hydrolysis of ethylmethylchlorosilane in an ether solution. By equilibration with octamethylcyclotetrasiloxane in the presence of 1 gram of sulfuric acid per silicon atom and after a reaction period of 10 hours at 10° C., a siloxane is formed having the following average formula:

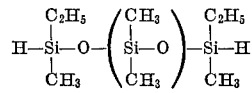

This siloxane is subjected to an addition reatcion with an allylpolyether of the following formula:

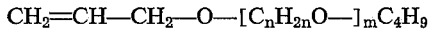

The mole weight of the polyoxyalkylene block in the polyether amounted to 1800. The polyoxyalkylene block consisted of 75% by weight of ethylene oxide and 25% by weight of propylene oxide. 1.1 mole of allylpolyether were dissolved in toluene and dried by azeotropic distillation. Subsequently, 0.5 mole of the above siloxane were added. The reaction mixture was heated to 120° C. After this temperature had been reached, 180 mg. of pyridine-ethylene-PtCl$_2$ were added as catalyst. After a reaction period of 15 hours, toluene is removed by distillation at reduced pressure and the reaction product obtained is filtered.

The iodine number was then ascertained in order to determine the still present allyl group. This indicated a yield corresponding to 95% of the theoretical amount.

By determining the remaining SiH-group a yield of 98.5% could be calculated.

The polyoxyalkylene-polysiloxane-mixed block polymer produced in this manner was equivalent to the products indicated in the table under A. It causes the formation of polyesterurethane foams of uniformly fine pore structure.

What is claimed is:

1. In a process for production of polyester urethane foams by reaction of hydroxylated polyesters with organic polyisocyanates in the presence of a blowing agent and a foam stabilizer, the improvement which comprises using as a foam stabilizer a polyoxyalkylene-polysiloxane mixed block polymer, said block polymer being characterized in that
    (a) the polyoxyalkylene blocks of the polymer have an average mole weight of about 1400 to 3000 and consist of 65 to 100% by weight of ethylene oxide, the remainder being propylene oxide, and
    (b) said block polymer has the average formula

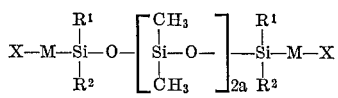

wherein
    X stands for [—C$_n$H$_{2n}$O]$_m$Z
    m and n are numbers consistent with the above definitions for molecular weight and ethylene oxide of the polyoxyalkylene block
    Z is alkyl, aryl or acyl
    M stands for O or —CH$_2$)$_3$O—
    R$^1$ and R$^2$ are methyl or ethyl
    a=0.5-4, the value for a being further defined by the condition that at least 2 of the Si atoms in the polysiloxane block are present in the form of dimethylsiloxy units.

2. A process as claimed in claim 1, wherein said polyoxyalkylene blocks have an average molecular weight of between 1600 and 2000.

3. A process as claimed in claim 1, wherein the polysiloxane blocks of said polyoxyalkylenepolysiloxane mixed block polymers are equilibrated prior to reaction with the polyoxyalkylene glycol derivatives.

4. A process as claimed in claim 1, wherein said polyoxyalkylene polysiloxane mixed block polymers have polysiloxane blocks whose molecular weights are in close proximity to a mean value of molecular weight.

References Cited

UNITED STATES PATENTS

| 3,483,240 | 12/1969 | Boudreau | 260—2.5 X |
|---|---|---|---|
| 3,444,105 | 5/1969 | West et al. | 260—2.5 |
| 3,280,160 | 10/1966 | Bailey | 260—2.5 X |
| 3,272,160 | 10/1966 | Ibbotson | 260—2.5 |
| 3,145,185 | 8/1964 | Remington | 260—2.5 |
| 3,518,288 | 6/1970 | Haluska | 260—2.5 X |
| 3,509,192 | 4/1970 | Niederprüm | 260—2.5 X |
| 3,507,815 | 4/1970 | Bailey | 260—2.5 X |
| 3,505,377 | 4/1970 | Morehouse | 260—2.5 X |

DONALD E. CZAJA, Primary Examiner

C. W. IVY, Assistant Examiner

U.S. Cl. X.R.

260—2.5 AN, 2.5 N, 448.8